United States Patent
Davis et al.

(10) Patent No.: US 9,174,412 B2
(45) Date of Patent: Nov. 3, 2015

(54) HIGH STRENGTH CARBON FIBER COMPOSITE WAFERS FOR MICROFABRICATION

(71) Applicants: Brigham Young University, Provo, UT (US); Moxtek, Inc., Orem, UT (US)

(72) Inventors: Robert C. Davis, Provo, UT (US); Richard Vanfleet, Provo, UT (US); Kyle Zufeldt, Orem, UT (US); Andrew L. Davis, Provo, UT (US); Steven D. Liddiard, Springville, UT (US)

(73) Assignees: Brigham Young University, Provo, UT (US); Moxtek, Inc., Orem, UT (US)

( * ) Notice: Subject to any disclaimer, the term of this patent is extended or adjusted under 35 U.S.C. 154(b) by 0 days.

(21) Appl. No.: 13/667,273

(22) Filed: Nov. 2, 2012

(65) Prior Publication Data
US 2013/0315380 A1    Nov. 28, 2013

Related U.S. Application Data

(63) Continuation-in-part of application No. 13/453,066, filed on Apr. 23, 2012.

(60) Provisional application No. 61/689,392, filed on Jun. 6, 2012, provisional application No. 61/486,547, filed on May 16, 2011, provisional application No. 61/495,616, filed on Jun. 10, 2011, provisional application No. 61/511,793, filed on Jul. 26, 2011.

(51) Int. Cl.
*H01J 35/18* (2006.01)
*H01J 5/18* (2006.01)
(Continued)

(52) U.S. Cl.
CPC ... *B32B 7/02* (2013.01); *G21K 1/00* (2013.01); *H01J 5/18* (2013.01); *H01J 9/24* (2013.01);
(Continued)

(58) Field of Classification Search
CPC ......... H01J 5/18; H01J 2235/18; H01J 35/18; H01J 2235/183; H01J 9/24; B32B 7/02; G21K 1/00; Y10T 428/21424; B29K 2307/04
See application file for complete search history.

(56) References Cited

U.S. PATENT DOCUMENTS

| 1,276,706 A | 5/1918 | Snook et al. |
| 1,881,448 A | 10/1932 | Forde et al. |

(Continued)

FOREIGN PATENT DOCUMENTS

| DE | 1030936 | 5/1958 |
| DE | 4430623 | 3/1996 |

(Continued)

OTHER PUBLICATIONS

PCT application EP12167551.6; filed May 10, 2012: Robert C. Davis; European search report mailed Nov. 21, 2013.

(Continued)

*Primary Examiner* — Glen Kao
*Assistant Examiner* — Dani Fox
(74) *Attorney, Agent, or Firm* — Thorpe North & Western, LLP

(57) ABSTRACT

A high strength carbon fiber composite (CFC) wafer, and method of making such wafer, with low surface roughness comprising at least one sheet of CFC including carbon fibers embedded in a matrix. The wafer can have a thickness of between 10-500 micrometers. The wafer can have a root mean square surface roughness Rq, on at least one side, of less than 300 nm in an area of 100 micrometers by 100 micrometers and less than 500 nm along a line of 2 millimeter length. The wafer may be cut to form x-ray window support structures, MEMS, or other micrometer sized structures.

13 Claims, 5 Drawing Sheets

(51) Int. Cl.
*H01J 33/04* (2006.01)
*B32B 7/02* (2006.01)
*G21K 1/00* (2006.01)
*H01J 9/24* (2006.01)
*B29K 307/04* (2006.01)

(52) U.S. Cl.
CPC ............ *H01J 35/18* (2013.01); *B29K 2307/04* (2013.01); *H01J 2235/18* (2013.01); *H01J 2235/183* (2013.01); *Y10T 428/24124* (2015.01)

(56) References Cited

U.S. PATENT DOCUMENTS

| | | |
|---|---|---|
| 1,946,288 A | 2/1934 | Kearsley |
| 2,291,948 A | 8/1942 | Cassen |
| 2,316,214 A | 4/1943 | Atlee et al. |
| 2,329,318 A | 9/1943 | Atlee et al. |
| 2,340,363 A | 2/1944 | Atlee et al. |
| 2,502,070 A | 3/1950 | Atlee et al. |
| 2,663,812 A | 3/1950 | Jamison et al. |
| 2,683,223 A | 7/1954 | Hosemann |
| 2,952,790 A | 9/1960 | Steen |
| 3,397,337 A | 8/1968 | Denholm |
| 3,538,368 A | 11/1970 | Oess |
| 3,665,236 A | 5/1972 | Gaines et al. |
| 3,679,927 A | 7/1972 | Kirkendall |
| 3,691,417 A | 9/1972 | Gralenski |
| 3,741,797 A | 6/1973 | Chavasse, Jr. et al. |
| 3,751,701 A | 8/1973 | Gralenski et al. |
| 3,801,847 A | 4/1974 | Dietz |
| 3,828,190 A | 8/1974 | Dahlin et al. |
| 3,873,824 A | 3/1975 | Bean et al. |
| 3,882,339 A | 5/1975 | Rate et al. |
| 3,962,583 A | 6/1976 | Holland et al. |
| 3,970,884 A | 7/1976 | Golden |
| 4,007,375 A | 2/1977 | Albert |
| 4,075,526 A | 2/1978 | Grubis |
| 4,126,788 A | 11/1978 | Koontz et al. |
| 4,160,311 A | 7/1979 | Ronde et al. |
| 4,163,900 A | 8/1979 | Warren et al. |
| 4,178,509 A | 12/1979 | More et al. |
| 4,184,097 A | 1/1980 | Auge |
| 4,250,127 A | 2/1981 | Warren et al. |
| 4,368,538 A | 1/1983 | McCorkle |
| 4,393,127 A | 7/1983 | Greschner et al. |
| 4,443,293 A | 4/1984 | Mallon et al. |
| 4,463,257 A | 7/1984 | Simpkins et al. |
| 4,463,338 A | 7/1984 | Utner et al. |
| 4,521,902 A | 6/1985 | Peugeot |
| 4,532,150 A | 7/1985 | Endo et al. |
| 4,573,186 A | 2/1986 | Reinhold |
| 4,576,679 A | 3/1986 | White |
| 4,584,056 A | 4/1986 | Perret et al. |
| 4,591,756 A | 5/1986 | Avnery |
| 4,608,326 A | 8/1986 | Neukermans et al. |
| 4,645,977 A | 2/1987 | Kurokawa et al. |
| 4,675,525 A | 6/1987 | Amingual et al. |
| 4,679,219 A | 7/1987 | Ozaki |
| 4,688,241 A | 8/1987 | Peugeot |
| 4,696,994 A | 9/1987 | Nakajima |
| 4,705,540 A | 11/1987 | Hayes |
| 4,777,642 A | 10/1988 | Ono |
| 4,797,907 A | 1/1989 | Anderton |
| 4,818,806 A | 4/1989 | Kunimune et al. |
| 4,819,260 A | 4/1989 | Haberrecker |
| 4,837,068 A | 6/1989 | Martin et al. |
| 4,862,490 A | 8/1989 | Karnezos et al. |
| 4,870,671 A | 9/1989 | Hershyn |
| 4,876,330 A | 10/1989 | Higashi et al. |
| 4,878,866 A | 11/1989 | Mori et al. |
| 4,885,055 A | 12/1989 | Woodbury et al. |
| 4,891,831 A | 1/1990 | Tanaka et al. |
| 4,933,557 A | 6/1990 | Perkins |
| 4,939,763 A | 7/1990 | Pinneo et al. |
| 4,957,773 A | 9/1990 | Spencer et al. |
| 4,960,486 A | 10/1990 | Perkins et al. |
| 4,969,173 A | 11/1990 | Valkonet |
| 4,979,198 A | 12/1990 | Malcolm et al. |
| 4,979,199 A | 12/1990 | Cueman et al. |
| 5,010,562 A | 4/1991 | Hernandez et al. |
| 5,055,421 A | 10/1991 | Birkle et al. |
| 5,063,324 A | 11/1991 | Grunwald et al. |
| 5,066,300 A | 11/1991 | Isaacson et al. |
| 5,077,771 A | 12/1991 | Skillicorn et al. |
| 5,077,777 A | 12/1991 | Daly |
| 5,090,046 A | 2/1992 | Friel |
| 5,105,456 A | 4/1992 | Rand et al. |
| 5,117,829 A | 6/1992 | Miller et al. |
| 5,153,900 A | 10/1992 | Nomikos et al. |
| 5,161,179 A | 11/1992 | Suzuki et al. |
| 5,173,612 A | 12/1992 | Imai et al. |
| 5,196,283 A | 3/1993 | Ikeda et al. |
| 5,206,534 A | 4/1993 | Birkle et al. |
| 5,217,817 A | 6/1993 | Verspui et al. |
| 5,226,067 A | 7/1993 | Allred et al. |
| RE34,421 E | 10/1993 | Parker et al. |
| 5,258,091 A | 11/1993 | Imai et al. |
| 5,267,294 A | 11/1993 | Kuroda et al. |
| 5,343,112 A | 8/1994 | Wegmann |
| 5,391,958 A | 2/1995 | Kelly |
| 5,392,042 A | 2/1995 | Pellon |
| 5,400,385 A | 3/1995 | Blake et al. |
| 5,422,926 A | 6/1995 | Smith et al. |
| 5,428,658 A | 6/1995 | Oettinger et al. |
| 5,432,003 A | 7/1995 | Plano et al. |
| 5,457,041 A | 10/1995 | Ginaven et al. |
| 5,465,023 A | 11/1995 | Garner |
| 5,469,429 A | 11/1995 | Yamazaki et al. |
| 5,469,490 A | 11/1995 | Golden et al. |
| 5,478,266 A | 12/1995 | Kelly |
| 5,524,133 A | 6/1996 | Neale et al. |
| 5,561,342 A | 10/1996 | Roeder et al. |
| 5,567,929 A | 10/1996 | Ouimette |
| RE35,383 E | 11/1996 | Miller et al. |
| 5,571,616 A | 11/1996 | Phillips et al. |
| 5,578,360 A | 11/1996 | Viitanen |
| 5,607,723 A | 3/1997 | Plano et al. |
| 5,616,179 A | 4/1997 | Baldwin et al. |
| 5,621,780 A | 4/1997 | Smith et al. |
| 5,627,871 A | 5/1997 | Wang |
| 5,631,943 A | 5/1997 | Miles |
| 5,680,433 A | 10/1997 | Jensen |
| 5,682,412 A | 10/1997 | Skillicorn et al. |
| 5,696,808 A | 12/1997 | Lenz |
| 5,729,583 A | 3/1998 | Tang et al. |
| 5,740,228 A | 4/1998 | Schmidt et al. |
| 5,774,522 A | 6/1998 | Warburton |
| 5,812,632 A | 9/1998 | Schardt et al. |
| 5,835,561 A | 11/1998 | Moorman et al. |
| 5,870,051 A | 2/1999 | Warburton |
| 5,898,754 A | 4/1999 | Gorzen |
| 5,907,595 A | 5/1999 | Sommerer |
| 6,002,202 A | 12/1999 | Meyer et al. |
| 6,005,918 A | 12/1999 | Harris et al. |
| 6,044,130 A | 3/2000 | Inazura et al. |
| 6,062,931 A | 5/2000 | Chuang et al. |
| 6,069,278 A | 5/2000 | Chuang |
| 6,075,839 A | 6/2000 | Treseder |
| 6,097,790 A | 8/2000 | Hasegawa et al. |
| 6,133,401 A | 10/2000 | Jensen |
| 6,134,300 A | 10/2000 | Trebes et al. |
| 6,184,333 B1 | 2/2001 | Gray |
| 6,205,200 B1 | 3/2001 | Boyer et al. |
| 6,282,263 B1 | 8/2001 | Arndt et al. |
| 6,288,209 B1 | 9/2001 | Jensen |
| 6,307,008 B1 | 10/2001 | Lee et al. |
| 6,320,019 B1 | 11/2001 | Lee et al. |
| 6,351,520 B1 | 2/2002 | Inazaru |
| 6,385,294 B2 | 5/2002 | Suzuki et al. |
| 6,438,207 B1 | 8/2002 | Chidester et al. |
| 6,447,880 B1* | 9/2002 | Coppens ...................... 428/174 |
| 6,477,235 B2 | 11/2002 | Chornenky et al. |
| 6,487,272 B1 | 11/2002 | Kutsuzawa |
| 6,487,273 B1 | 11/2002 | Takenaka et al. |

(56) References Cited

U.S. PATENT DOCUMENTS

| | | | |
|---|---|---|---|
| 6,494,618 B1 | 12/2002 | Moulton | |
| 6,546,077 B2 | 4/2003 | Chornenky et al. | |
| 6,567,500 B2 | 5/2003 | Rother | |
| 6,646,366 B2 | 11/2003 | Hell et al. | |
| 6,658,085 B2 | 12/2003 | Sklebitz | |
| 6,661,876 B2 | 12/2003 | Turner et al. | |
| 6,738,484 B2 | 5/2004 | Nakabayashi | |
| 6,740,874 B2 | 5/2004 | Doring | |
| 6,778,633 B1 | 8/2004 | Loxley et al. | |
| 6,799,075 B1 | 9/2004 | Chornenky et al. | |
| 6,803,570 B1 | 10/2004 | Bryson, III et al. | |
| 6,816,573 B2 | 11/2004 | Hirano et al. | |
| 6,819,741 B2 | 11/2004 | Chidester | |
| 6,838,297 B2 | 1/2005 | Iwasaki | |
| 6,852,365 B2 | 2/2005 | Smart et al. | |
| 6,876,724 B2 | 4/2005 | Zhou | |
| 6,956,706 B2 | 10/2005 | Brandon | |
| 6,962,782 B1 | 11/2005 | Livache et al. | |
| 6,976,953 B1 | 12/2005 | Pelc | |
| 6,987,835 B2 | 1/2006 | Lovoi | |
| 7,035,379 B2 | 4/2006 | Turner et al. | |
| 7,046,767 B2 | 5/2006 | Okada et al. | |
| 7,085,354 B2 | 8/2006 | Kanagami | |
| 7,130,380 B2 | 10/2006 | Lovoi et al. | |
| 7,130,381 B2 | 10/2006 | Lovoi et al. | |
| 7,166,910 B2 | 1/2007 | Minervini | |
| 7,203,283 B1 | 4/2007 | Puusaari | |
| 7,206,381 B2 | 4/2007 | Shimono et al. | |
| 7,215,741 B2 | 5/2007 | Ukita | |
| 7,224,769 B2 | 5/2007 | Turner | |
| 7,233,647 B2 | 6/2007 | Turner et al. | |
| 7,286,642 B2 | 10/2007 | Ishikawa et al. | |
| 7,305,066 B2 | 12/2007 | Ukita | |
| 7,358,593 B2 | 4/2008 | Smith et al. | |
| 7,364,794 B2* | 4/2008 | Ohnishi et al. | 428/408 |
| 7,378,157 B2 | 5/2008 | Sakakura et al. | |
| 7,382,862 B2 | 6/2008 | Bard et al. | |
| 7,428,054 B2 | 9/2008 | Yu et al. | |
| 7,428,298 B2 | 9/2008 | Bard et al. | |
| 7,448,801 B2 | 11/2008 | Oettinger et al. | |
| 7,448,802 B2 | 11/2008 | Oettinger et al. | |
| 7,486,774 B2 | 2/2009 | Cain | |
| 7,526,068 B2 | 4/2009 | Dinsmore | |
| 7,529,345 B2 | 5/2009 | Bard et al. | |
| 7,618,906 B2 | 11/2009 | Meilahti | |
| 7,634,052 B2 | 12/2009 | Grodzins | |
| 7,649,980 B2 | 1/2010 | Aoki et al. | |
| 7,657,002 B2 | 2/2010 | Burke et al. | |
| 7,684,545 B2 | 3/2010 | Damento et al. | |
| 7,693,265 B2 | 4/2010 | Hauttmann et al. | |
| 7,709,820 B2* | 5/2010 | Decker et al. | 250/505.1 |
| 7,737,424 B2 | 6/2010 | Xu et al. | |
| 7,756,251 B2 | 7/2010 | Davis et al. | |
| 7,983,394 B2 | 7/2011 | Kozaczek | |
| 8,498,381 B2 | 7/2013 | Liddiard et al. | |
| 8,929,515 B2 | 1/2015 | Liddiard | |
| 2002/0075999 A1 | 6/2002 | Rother | |
| 2002/0094064 A1 | 7/2002 | Zhou | |
| 2003/0096104 A1 | 5/2003 | Tobita et al. | |
| 2003/0117770 A1 | 6/2003 | Montgomery et al. | |
| 2003/0122111 A1 | 7/2003 | Glatkowski | |
| 2003/0152700 A1 | 8/2003 | Asmussen et al. | |
| 2004/0076260 A1 | 4/2004 | Charles, Jr. et al. | |
| 2004/0131835 A1 | 7/2004 | Schmitt et al. | |
| 2005/0018817 A1 | 1/2005 | Oettinger et al. | |
| 2005/0141669 A1 | 6/2005 | Shimono et al. | |
| 2005/0207537 A1 | 9/2005 | Ukita | |
| 2006/0098778 A1 | 5/2006 | Oettinger et al. | |
| 2006/0233307 A1 | 10/2006 | Dinsmore | |
| 2006/0269048 A1 | 11/2006 | Cain | |
| 2007/0025516 A1 | 2/2007 | Bard et al. | |
| 2007/0087436 A1 | 4/2007 | Miyawaki et al. | |
| 2007/0111617 A1 | 5/2007 | Meilahti | |
| 2007/0133921 A1 | 6/2007 | Haffner et al. | |
| 2007/0165780 A1 | 7/2007 | Durst et al. | |
| 2007/0183576 A1 | 8/2007 | Burke et al. | |
| 2008/0181365 A1* | 7/2008 | Matoba | 378/140 |
| 2008/0199399 A1 | 8/2008 | Chen et al. | |
| 2008/0296479 A1 | 12/2008 | Anderson et al. | |
| 2008/0296518 A1 | 12/2008 | Xu et al. | |
| 2008/0317982 A1 | 12/2008 | Hecht | |
| 2009/0086923 A1 | 4/2009 | Davis et al. | |
| 2010/0003186 A1* | 1/2010 | Yoshikawa et al. | 423/447.2 |
| 2010/0096595 A1 | 4/2010 | Prud'Homme et al. | |
| 2010/0126660 A1 | 5/2010 | O'Hara | |
| 2010/0140497 A1 | 6/2010 | Damiano, Jr. et al. | |
| 2010/0239828 A1 | 9/2010 | Cornaby et al. | |
| 2010/0243895 A1 | 9/2010 | Xu et al. | |
| 2010/0248343 A1 | 9/2010 | Aten et al. | |
| 2010/0285271 A1 | 11/2010 | Davis et al. | |
| 2010/0323419 A1 | 12/2010 | Aten et al. | |
| 2011/0017921 A1 | 1/2011 | Jiang et al. | |
| 2011/0031566 A1 | 2/2011 | Kim et al. | |
| 2011/0089330 A1 | 4/2011 | Thomas | |
| 2011/0121179 A1 | 5/2011 | Liddiard | |
| 2012/0003448 A1 | 1/2012 | Weigel et al. | |
| 2012/0025110 A1 | 2/2012 | Davis | |
| 2012/0087476 A1 | 4/2012 | Liddiard | |
| 2012/0213336 A1 | 8/2012 | Liddiard | |
| 2013/0051535 A1 | 2/2013 | Davis | |
| 2013/0064355 A1 | 3/2013 | Davis | |
| 2013/0077761 A1 | 3/2013 | Sipila | |
| 2013/0089184 A1 | 4/2013 | Sipila | |
| 2013/0094629 A1 | 4/2013 | Liddiard | |
| 2013/0315380 A1 | 11/2013 | Davis et al. | |
| 2014/0140487 A1 | 5/2014 | Harker et al. | |
| 2015/0016593 A1 | 1/2015 | Larson et al. | |

FOREIGN PATENT DOCUMENTS

| | | |
|---|---|---|
| DE | 19818057 | 11/1999 |
| EP | 0297808 | 1/1989 |
| EP | 0330456 | 8/1989 |
| EP | 0400655 | 5/1990 |
| EP | 0400655 A1 | 12/1990 |
| EP | 0676772 | 3/1995 |
| GB | 1252290 | 11/1971 |
| JP | 57082954 | 8/1982 |
| JP | S6074253 | 4/1985 |
| JP | S6089054 | 5/1985 |
| JP | 3170673 | 7/1991 |
| JP | 05066300 | 3/1993 |
| JP | 5135722 | 6/1993 |
| JP | 06119893 | 7/1994 |
| JP | 6289145 | 10/1994 |
| JP | 6343478 | 12/1994 |
| JP | 8315783 | 11/1996 |
| JP | 2001179844 | 7/2001 |
| JP | 2003/007237 | 1/2003 |
| JP | 2003/088383 | 3/2003 |
| JP | 2003510236 | 3/2003 |
| JP | 2003/3211396 | 7/2003 |
| JP | 4171700 | 6/2006 |
| JP | 2006297549 | 11/2006 |
| KR | 10-2005-0107094 | 11/2005 |
| WO | WO 99/65821 | 12/1999 |
| WO | WO 00/09443 | 2/2000 |
| WO | WO 00/17102 | 3/2000 |
| WO | WO 03/076951 | 9/2003 |
| WO | WO 2008/052002 | 5/2008 |
| WO | WO 2009/009610 | 1/2009 |
| WO | WO 2009/045915 | 4/2009 |
| WO | WO 2009/085351 | 7/2009 |
| WO | WO 2010/107600 | 9/2010 |

OTHER PUBLICATIONS

U.S. Appl. No. 11/756,962, filed Jun. 1, 2007; Anderson et al.
U.S. Appl. No. 12/352,864, filed Jan. 13, 2009; Lines.
U.S. Appl. No. 12/726,120, filed Mar. 17, 2010; Lines.
U.S. Appl. No. 12/640,154, filed Dec. 17, 2009; Krzysztof Kozaczek.
U.S. Appl. No. 12/783,707, filed May 20, 2010; Steven D. Liddiard.
U.S. Appl. No. 12/899,750, filed Oct. 7, 2010; Steven Liddiard.
U.S. Appl. No. 13/018,667, filed Feb. 1, 2011; Lei Pei.

(56) References Cited

OTHER PUBLICATIONS

U.S. Appl. No. 13/312,531, filed Dec. 6, 2011; Steven Liddiard.
U.S. Appl. No. 13/312,531, filed Dec. 6, 2011; Steven Liddiard; office action dated Dec. 20, 2013.
U.S. Appl. No. 12/899,750, filed Oct. 7, 2010; Steven Liddiard; notice of allowance and fee(s) mailed Jun. 4, 2013.
Barkan et al., "Improved window for low-energy x-ray transmission a Hybrid design for energy-dispersive microanalysis," Sep. 1995, 2 pages, Ectroscopy 10(7).
Blanquart et al.; "XPAD, a New Read-out Pixel Chip for X-ray Counting"; IEEE Xplore; Mar. 25, 2009.
Comfort, J. H., "Plasma-enhanced chemical vapor deposition of in situ doped epitaxial silicon at low temperatures," J. Appl. Phys. 65, 1067 (1989).
Grybos et al.; "DEDIX—Development of Fully Integrated Multichannel ASIC for High Count Rate Digital X-ray Imagining systems"; IEEE 2006; Nuclear Science Symposium Conference Record.
Grybos, "Pole-Zero Cancellations Circuit With Pulse Pile-Up Tracking System for Low Noise Charge-Sensitive Amplifiers"; Mar. 25, 2009; from IEEE Xplore.
Grybos, et al "Measurements of Matching and High Count Rate Performance of Multichannel ASIC for Digital X-Ray Imaging Systems"; IEEE Transactions on Nuclear Science, vol. 54, No. 4, 2007.
Hanigofsky, J. A., K. L. More, and W. J. Lackey, "Composition and microstructure of chemically vapor-deposited boron nitride, aluminum nitride, and boron nitride + aluminum nitride composites," J. Amer. Ceramic Soc. 74, 301 (1991).
http://www.orau.org/ptp/collection/xraytubescollidge/MachelettCW250.htm, 1999, 2 pgs.
Komatsu, S., and Y. Moriyoshi, "Influence of atomic hydrogen on the growth reactions of amorphous boron films in a low-pressure $B_2H_6$ +He+$H_2$ plasma", J. Appl. Phys. 64, 1878 (1988).
Komatsu, S., and Y. Moriyoshi, "Transition from amorphous to crystal growth of boron films in plasma-enhanced chemical vapor deposition with $B_2H_6$ +He," J. Appl. Phys., 66, 466 (1989).
Komatsu, S., and Y. Moriyoshi, "Transition from thermal-to electron-impact decomposition of diborane in plasma-enhanced chemical vapor deposition of boron films from $B_2H_6$ +He," J. Appl. Phys. 66, 1180 (1989).
Lee, W., W. J. Lackey, and P. K. Agrawal, "Kinetic analysis of chemical vapor deposition of boron nitride," J. Amer. Ceramic Soc. 74, 2642 (1991).
Maya, L., and L. A. Harris, "Pyrolytic deposition of carbon films containing nitrogen and/or boron," J. Amer. Ceramic Soc. 73, 1912 (1990).
Michaelidis, M., and R. Pollard, "Analysis of chemical vapor deposition of boron," J. Electrochem. Soc. 132, 1757 (1985).
Micro X-ray Tube Operation Manual, X-ray and Specialty Instruments Inc., 1996, 5 pages.
Moore, A. W., S. L. Strong, and G. L. Doll, "Properties and characterization of codeposited boron nitride and carbon materials," J. Appl. Phys. 65, 5109 (1989).
Nakajima et al; Trial Use of Carbon-Fiber-Reinforced Plastic as a Non-Bragg Window Material of X-Ray Transmission; Rev. Sci. Instrum.; Jul. 1989; pp. 2432-2435; vol. 60, No. 7.
Nakamura, K., "Preparation and properties of amorphous boron nitride films by molecular flow chemical vapor deposition," J. Electrochem. Soc. 132, 1757 (1985).
Panayiotatos, et al., "Mechanical performance and growth characteristics of boron nitride films with respect to their optical, compositional properties and density," Surface and Coatings Technology, 151-152 (2002) 155-159.
Perkins, F. K., R. A. Rosenberg, and L. Sunwoo, "Synchrotronradiation deposition of boron and boron carbide films from boranes and carboranes: decaborane," J. Appl. Phys. 69,4103 (1991).
Rankov. A. "A Novel Correlated Double Sampling Poly-Si Circuit for Readout System in Large Area X-Ray Sensors", 2005.
Roca i Cabarrocas, P., S. Kumar, and B. Drevillon, "In situ study of the thermal decomposition of $B_2H_6$ by combining spectroscopic ellipsometry and Kelvin probe measurements," J. Appl. Phys. 66, 3286 (1989).
Scholze et al., "Detection efficiency of energy-dispersive detectors with low-energy windows" X-Ray Spectrometry, X-Ray Spectrom, 2005: 34: 473-476.
Shirai, K., S.-I. Gonda, and S. Gonda, "Characterization of hydrogenated amorphous boron films prepared by electron cyclotron resonance plasma chemical vapor deposition method," J. Appl. Phys. 67, 6286 (1990).
Tamura, et al "Developmenmt of ASICs for CdTe Pixel and Line Sensors", IEEE Transactions on Nuclear Science, vol. 52, No. 5, Oct. 2005.
Tien-Hui Lin et al., "An investigation on the films used as teh windows of ultra-soft X-ray counters." Acta Physica Sinica, vol. 27, No. 3, pp. 276-283, May 1978, abstract only.
Vandenbulcke, L. G., "Theoretical and experimental studies on the chemical vapor deposition of boron carbide," Indust. Eng. Chem. Prod. Res. Dev. 24, 568 (1985).
Viitanen Veli-Pekka et al., Comparison of Ultrathin X-Ray Window Designs, presented at the Soft X-rays in the 21st Century Conference held in Provo, Utah Feb. 10-13, 1993, pp. 182-190.
Wagner et al, "Effects of Scatter in Dual-Energy Imaging: An Alternative Analysis"; IEEE; Sep. 1989; vol. 8. No. 3.
Winter, J., H. G. Esser, and H. Reimer, "Diborane-free boronization," Fusion Technol. 20, 225 (1991).
Wu, et al.; "Mechanical properties and thermo-gravimetric analysis of PBO thin films"; Advanced Materials Laboratory, Institute of Electro-Optical Engineering; Apr. 30, 2006.
www.moxtek.com, Moxtek, AP3 Windows, Ultra-thin Polymer X-Ray Windows, Sep. 2006, 2 pages.
www.moxtek.com, Moxtek, DuraBeryllium X-Ray Windows, May 2007, 2 pages.
www.moxtek.com, Moxtek, ProLine Series 10 Windows, Ultra-thin Polymer X-Ray Windows, Sep. 2006, 2 pages.
www.moxtek.com, Moxtek, Sealed Proportional Counter X-Ray Windows, Oct. 2007, 3 pages.
Yan, Xing-Bin, et al., Fabrications of Three-Dimensional ZnO—Carbon Nanotube (CNT) Hybrids Using Self-Assembled CNT Micropatterns as Framework, 2007. pp. 17254-17259, vol. III.
U.S. Appl. No. 13/307,579, filed Nov. 30, 2011; Dongbing Wang.
U.S. Appl. No. 13/855,575, filed Apr. 2, 2013; Robert C. Davis.

* cited by examiner

HIGH STRENGTH CARBON FIBER COMPOSITE WAFERS FOR MICROFABRICATION

CLAIM OF PRIORITY

Priority is claimed to U.S. Provisional Patent Application Ser. No. 61/689,392, filed on Jun. 6, 2012; which is hereby incorporated herein by reference in its entirety.

This is a continuation-in-part of U.S. patent application Ser. No. 13/453,066, filed on Apr. 23, 2012, which claims priority to U.S. Provisional Patent Application Nos. 61/486,547, filed on May 16, 2011; 61/495,616, filed on Jun. 10, 2011; and 61/511,793, filed on Jul. 26, 2011; all of which are hereby incorporated herein by reference in their entirety.

FIELD OF THE INVENTION

The present application is related generally to high strength microstructures, such as for example x-ray window support structures.

BACKGROUND

Carbon fiber composite (CFC) wafers can be used in applications where high strength is desired. Barriers to the development of carbon fiber based structures, especially structures with micrometer-sized features, include difficulties in machining or patterning, and high surface roughness of cured composites. A root mean square surface roughness Rq of typical CFC wafers can be greater than 1 micrometer. Root mean square surface roughness Rq can be defined by the following equation: $R_q = \sqrt{\Sigma z_i^2}$. In this equation, z represents a height of the surface at different measured locations i.

SUMMARY

It has been recognized that it would be advantageous to have a carbon fiber composite wafer having high strength and low surface roughness.

In one embodiment, the present invention is directed to a carbon fiber composite (CFC) wafer that satisfies the needs for high strength and low surface roughness. The CFC wafer comprises at least one sheet of CFC including carbon fibers embedded in a matrix. The wafer can have a thickness of between 10-500 micrometers. The wafer can have a root mean square surface roughness Rq, on at least one side, of less than 300 nm in an area of 100 micrometers by 100 micrometers and less than 500 nm along a line of 2 millimeter length. The wafer can have a yield strength at fracture of greater than 0.5 gigapascals, wherein yield strength is defined as the force, in a direction parallel with a plane of the wafer, per unit area, to cause the wafer to fracture. The wafer can have a strain at fracture of more than 0.01, wherein strain is defined as the change in length caused by a force in a direction parallel with a plane of the wafer divided by original length.

In another embodiment, the present invention is directed to a method of making a CFC wafer that satisfies the needs for high strength and low surface roughness. The method comprises pressing a stack of at least one sheet of CFC between pressure plates with a porous breather layer disposed between at least one side of the stack and at least one of the pressure plates; then heating the stack to a temperature of at least 50° C. to cure the stack into a CFC wafer.

In another embodiment, the present invention is directed to an x-ray window including a high strength support structure. The x-ray window can comprise a support frame defining a perimeter and an aperture with a plurality of ribs extending across the aperture of the support frame and carried by the support frame. Openings exist between the plurality of ribs. The support frame and the plurality of ribs comprise a support structure. A film can be disposed over, can be carried by, and can span the plurality of ribs and can be disposed over and can span the openings. The film can be configured to pass x-ray radiation therethrough. The support structure can comprise a carbon fiber composite material (CFC). The CFC material can comprise carbon fibers embedded in a matrix. A thickness of the support structure can be between 10-500 micrometers. A root mean square surface roughness Rq of the support structure on a side facing the film can be less than 500 nm along a line of 2 millimeter length.

DEFINITIONS

As used herein, the term "carbon fiber" or "carbon fibers" means solid, substantially cylindrically shaped structures having a mass fraction of at least 85% carbon, a length of at least 5 micrometers and a diameter of at least 1 micrometer.

As used herein, the term "directionally aligned," in referring to alignment of carbon fibers with support structure members (such as ribs for example), means that the carbon fibers are substantially aligned with a longitudinal axis of the support structure members and does not require the carbon fibers to be exactly aligned with a longitudinal axis of the support structure members.

As used herein, the term "porous" means readily permeable to gas.

DETAILED DESCRIPTION

Figure 1:
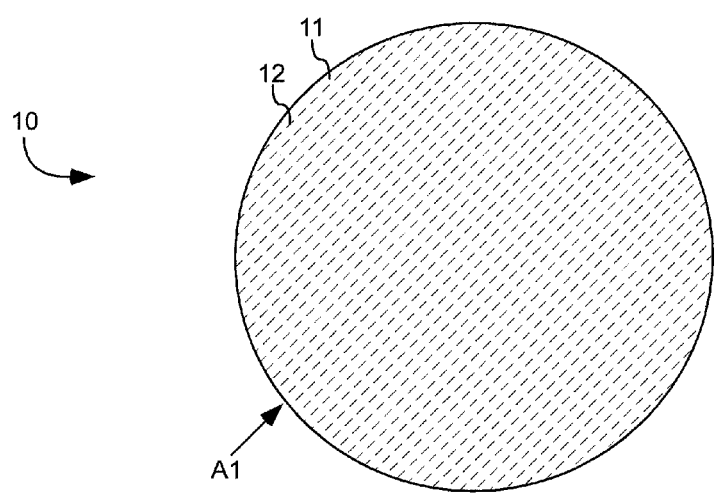
FIG. 1 is a schematic top view of a carbon fiber composite wafer, in accordance with an embodiment of the present invention.
Figure 2:
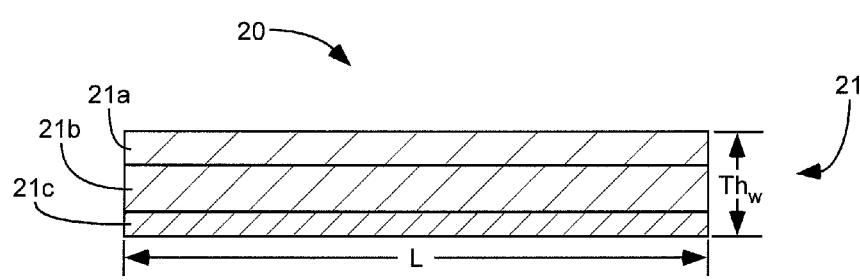
FIGS. 2-3 are schematic cross-sectional side views of a carbon fiber composite wafer, in accordance with an embodiment of the present invention.
Figure 3:
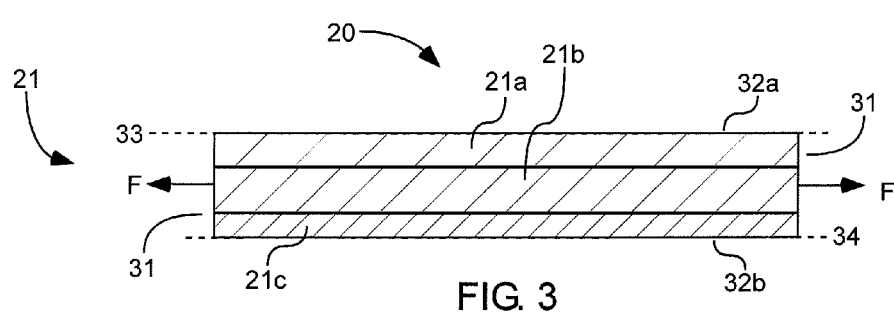

Illustrated in FIGS. 1-3 are carbon fiber composite (CFC) wafers 10 and 20 comprising at least one CFC sheet 21 including carbon fibers 12 embedded in a matrix 11. The matrix can comprise a material that provides sufficient strength and is compatible with the use of the wafer. For example, if the wafer will be used to fabricate an x-ray window support structure, considerations for matrix material may include a low atomic number elements and low outgassing. The matrix can comprise a material selected from the group consisting of polyimide, bismaleimide, epoxy, or combinations thereof. The matrix can comprise a material selected from the group consisting of amorphous carbon, hydrogenated amorphous carbon, nanocrystalline carbon, microcrystalline carbon, hydrogenated nanocrystalline carbon, hydrogenated microcrystalline carbon, or combinations thereof. The matrix can comprise a ceramic material selected from the group consisting of silicon nitride, boron nitride, boron carbide, aluminum nitride, or combinations thereof.

The carbon fibers 12 can be directionally aligned in a single direction A1, directionally aligned in multiple directions, or disposed in random directions in the matrix. Three CFC sheets 21a-c are shown in FIGS. 2-3. There may be more or less CFC sheets 21 than 3, depending on the desired application. The wafer 20 can have a thickness $Th_w$ of between 10-500 micrometers in one aspect, between 20 and 350 micrometers in another aspect, less than or equal to 20 micrometers in another aspect, or greater than or equal to 350 micrometers in another aspect.

CFC wafers per the present invention can have high yield strength. A yield strength at fracture can be greater than 0.1 gigapascals (GPa) in one aspect, greater than 0.5 GPa in another aspect, greater than 2 GPa in another aspect, between 2 GPa and 3.6 GPa in another aspect, or between 0.5 GPa and 6 GPa in another aspect. Yield strength can be defined as a force F in a direction parallel with a plane 33 or 34 of a side 32a or 32b of the wafer, per unit area, to cause the wafer to fracture. If fibers are directionally aligned, the force F can be aligned parallel with the fibers.

CFC wafers per the present invention can have high strain. A strain at fracture can be greater than 0.01 in one aspect, greater than 0.03 in another aspect, greater than 0.05 in another aspect, or between 0.01 and 0.080 in another aspect. Strain can be defined as the change in length L caused by a force F in a direction parallel with a plane 33 or 34 of the wafer divided by original length L. If fibers are directionally aligned, the force F can be aligned parallel with the fibers.

The wafer can have two faces or sides 32a-b and an edge 31. The sides 32a-b can have a substantially larger surface area than the edge 31. The sides 32a-b can be substantially parallel with each other. One side 32a can be disposed along, or parallel with, a single plane 33; and the other side 32b can be disposed along, or parallel with, a different single plane 34.

Figure 4:
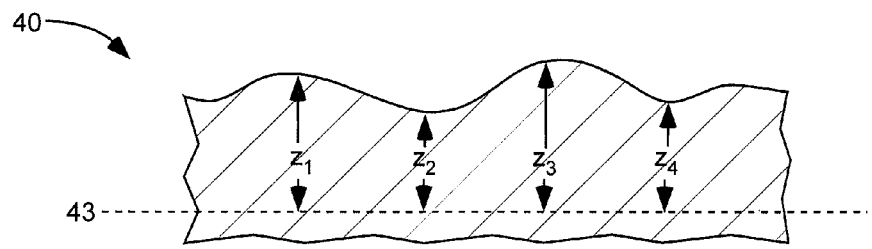
FIG. 4 is a schematic cross-sectional side view of portion of a carbon fiber composite wafer, showing measurement of root mean square surface roughness Rq, in accordance with an embodiment of the present invention.

At least one side 32a and/or 32b of the wafer can be smooth, i.e. can have a low surface roughness. A low surface roughness can be beneficial for improving adhesion to other materials, such as to an x-ray window film for example. One measurement of surface roughness is root mean square surface roughness Rq calculated by the equation $R_q = \sqrt{\Sigma z_i^2}$. The measurement $z_i$ can be made along a surface of the wafer by an atomic force microscope. The measurement of $z_i$ on a portion of the wafer 40 is shown in FIG. 4. A distance from a plane 43, substantially parallel with the wafer, or substantially parallel with the sides 32a and 32b of the wafer, can differ by small amounts. These small variations can be recorded, squared, summed, then a square root may be taken of this sum to calculate root mean square surface roughness Rq. A low Rq number can indicate a low surface roughness. The root mean square surface roughness Rq of one or both sides of the wafers of the present invention can be less than 300 nm in one aspect, or between 30 nm and 300 nm in another aspect, in an area of 100 micrometers by 100 micrometers. The root mean square surface roughness Rq of one or both sides of the wafers of the present invention can be less than 500 nm in one aspect, or between 50 nm and 500 nm in another aspect, along a line of 2 millimeter length. The root mean square surface roughness Rq of one or both sides of the wafers of the present invention can be less than 200 nanometers in one aspect, or between 20 nm and 200 nm in another aspect, in an area of 100 micrometers by 100 micrometers.

Figure 5:
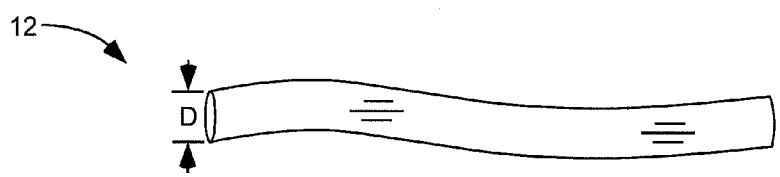
FIG. 5 is a side view of a carbon fiber, in accordance with an embodiment of the present invention.

Shown in FIG. 5 is a side view of a carbon fiber 12, in accordance with an embodiment of the present invention. At least 50% of the carbon fibers 12 in a wafer can have a diameter D of between 2 and 10 micrometers in one aspect. At least 90% of the carbon fibers 12 in a wafer can have a diameter D of between 2 and 10 micrometers in another aspect. Substantially all of the carbon fibers 12 in a wafer can have a diameter D of between 2 and 10 micrometers in another aspect.

Figure 6:
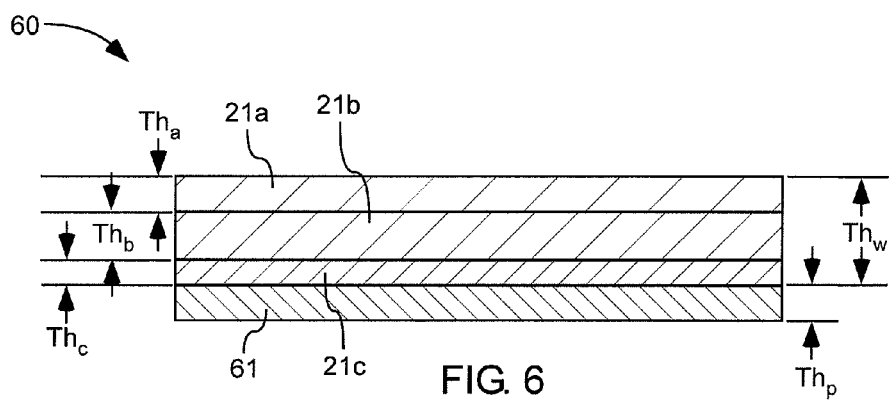
FIG. 6 is a schematic cross-sectional side view of wafer including multiple carbon fiber composite sheets abutting a polyimide sheet, in accordance with an embodiment of the present invention.

As shown on wafer 60 in FIG. 6, a polyimide sheet 61 can be cured together with and can abut the sheet(s) 21 of carbon fiber composite. The polyimide sheet can have a thickness $Th_p$, after curing, of between 0.1-100 micrometers.

Also shown on wafer 60 in FIG. 6 are carbon fiber composite sheet thicknesses $Th_{a-c}$. Each carbon fiber composite sheet 21a-c in the stack can have a thickness $Th_{a-c}$ of between 20 to 350 micrometers (20 µm<$Th_a$<350 µm, 20 µm<$Th_b$<350 µm, and 20 µm<$Th_c$<350 µm) in one aspect, less than or equal to 20 micrometers in another aspect, or greater than or equal to 350 micrometers in another aspect. There may be more or less than the three carbon fiber composite sheets 21a-c. These thicknesses are sheet 21 thicknesses after curing.

Figure 7:
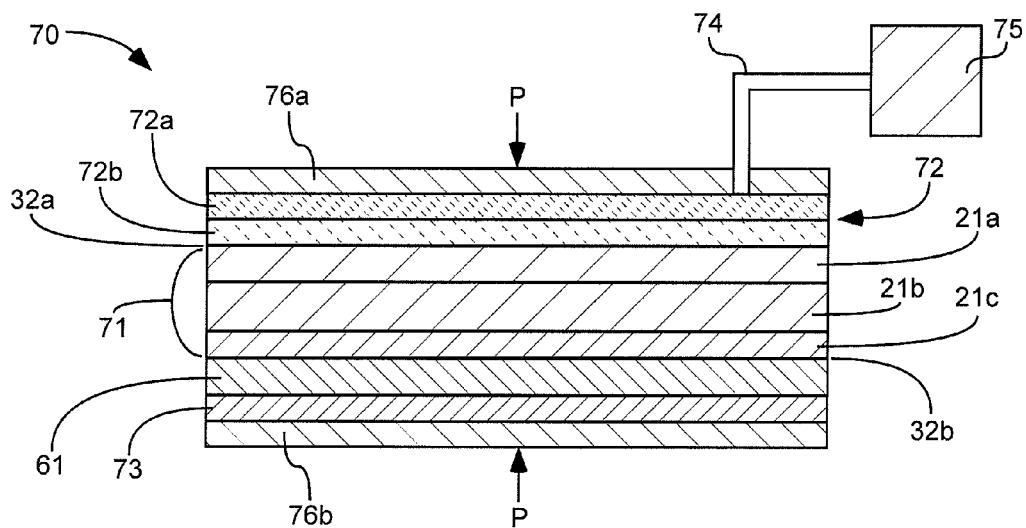
FIG. 7 illustrates a first curing process for manufacture of a carbon fiber composite wafer, in accordance with a method of the present invention.

FIG. 7 illustrates a first curing process 70 for manufacture of a carbon fiber composite wafer, in accordance with a method of the present invention. The method can comprise providing a stack 71 of at least one sheet of CFC 21a-c, the stack having a first surface 32a and a second surface 32b; pressing P the stack between a first pressure plate 76a and a second pressure plate 76b with a porous breather layer 72 disposed between the first surface 32a of the stack and the first pressure plate 76a; and curing by heating the stack 71 to a temperature of at least 50° C. (defining a first curing process). The amount of pressure to be used can depend on the matrix of the carbon composite. Pressure in the range of 50-200 psi has been successfully used. Pressure may be in the range of 25-500 psi.

A solid, polished layer 73 can be disposed between the second surface 32b of the stack 71 and the second pressure plate 76b during the first curing process. The polished layer 73 can help create a very smooth surface on the second surface 32b of the stack 71. The polished layer 73 can be a highly polished sheet of stainless steel, a silicon wafer, or a glass plate. A fluorine release layer can be used to avoid the stack sticking 71 to the polished layer 73. For example, a fluorinated alkane monolayer can be deposited on silicon wafers to facilitate release by placing in a vacuum desiccator overnight with 5 mL of Trichloro(1H,1H,2H,2H-perfluorooctyl)silane in a glass vial. The polished layer 73 can have a root mean square surface roughness Rq of less than 300 nm in an area of 100 micrometers by 100 micrometers, on a side facing the stack. Thus, it is not necessary for the polished layer 73 to have a polished surface on both sides.

A polyimide sheet 61 can be cured together with and can abut the CFC sheet(s) 21. The polyimide sheet 61 can be disposed between the second surface 32b of the stack 71 and the second pressure plate 76b. The polyimide sheet 61 can be disposed between the second surface 32b of the stack 71 and the polished layer 73 (if a polished layer is used). Alternatively, a polyimide sheet 61 can be disposed on both surfaces 32a and 32b of the stack 71. The polyimide sheet(s) 61 can be useful for improving the surface of the final wafer and/or for improving adhesion of the stack 71 to other materials.

The porous layer 72 can allow gas, emitted by the stack, to escape from the press. A multi-layer porous breather layer 72 can be used. For example, the porous breather layer 72 can comprise a porous polymer layer 72b facing the stack 71 and a nylon mesh 72a facing the first pressure plate 76a. A vacuum can aid in removal of the gas. A vacuum pump 75 can be attached by tubing 74 to the press and can draw a vacuum, such as less than 50 torr, between the pressure plates. The vacuum can be maintained through substantially all of the curing process, or through only part of the curing process, such as at least 50% of the curing process.

Figure 8:
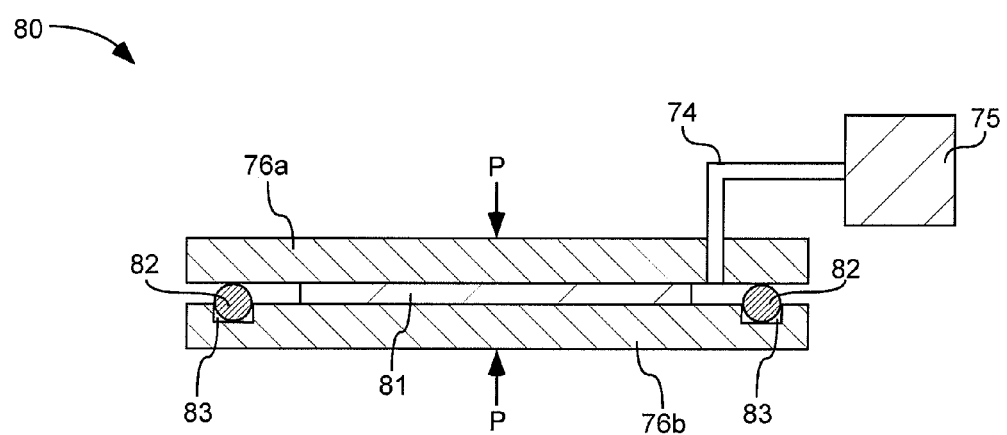
FIG. 8 illustrates use of o-rings and a vacuum during the first curing process for manufacture of a carbon fiber composite wafer, in accordance with a method of the present invention.

Shown in FIG. 8 are more details of the press and vacuum. The layers (stack of CFC, porous breather layer 72, optional polished layer 73, and optional polyimide layer 61) 81 can be in a central portion of the pressure plates 76a-b. An o-ring 82 can surround the layers 81. The o-ring 82 can be disposed at least partly in a channel 83 of at least one of the pressure plates 76a and/or 76b. The vacuum tube 74 can extend into the central portion of the press, between the layers 81 and the o-ring 82.

Figure 9:
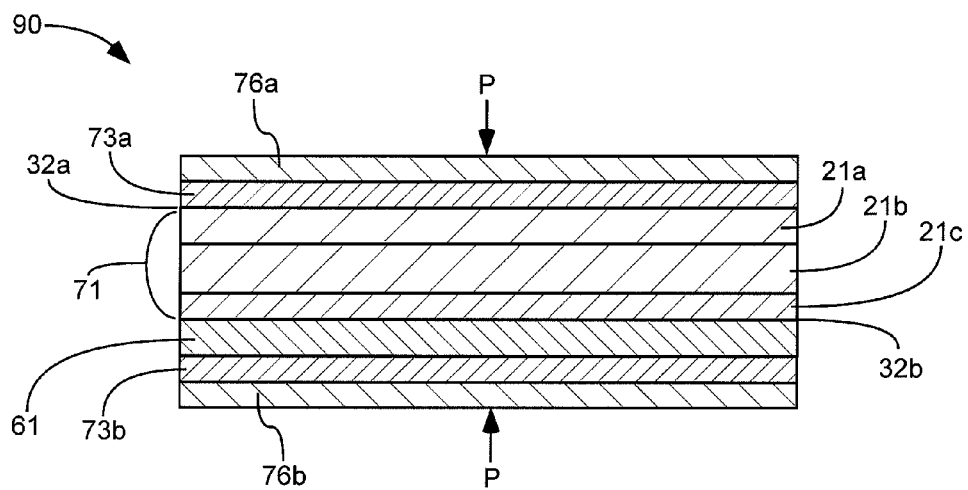
FIG. 9 illustrates a second curing process for manufacture of a carbon fiber composite wafer, in accordance with a method of the present invention.

FIG. 9 illustrates a second curing process 90 for manufacture of a carbon fiber composite wafer in accordance with a method of the present invention. After completion of the first curing process 70, pressure P can be released from the stack and the porous layer 72 can be removed from the stack. A polished layer 73a and 73b can be disposed on each side of the stack. Note that if there was a polyimide sheet 61 in the first curing process, this polyimide sheet 61 can remain for the second curing process 90. The polished layers 73a and 73b can have a root mean square surface roughness Rq of less than 300 nm in an area of 100 micrometers by 100 micrometers, on a side facing the stack. The stack 71 (and optional polyimide sheet 61 if one is used) can be pressed between the polished layers by the first and second pressure plates 76a-b. The stack 71 (and optional polyimide layer 61) can be cured by heating the stack to a temperature of at least 50° C.

A benefit of use of the second curing process 90 is that the gas can be removed during the first curing process 70, then polished layers 73a and 73b can be disposed on both sides 32a and 32b of the stack 71, with the result that both sides of the wafer can be highly polished. Thus, both sides of the wafer can have a root mean square surface roughness Rq as specified above.

Figure 10:
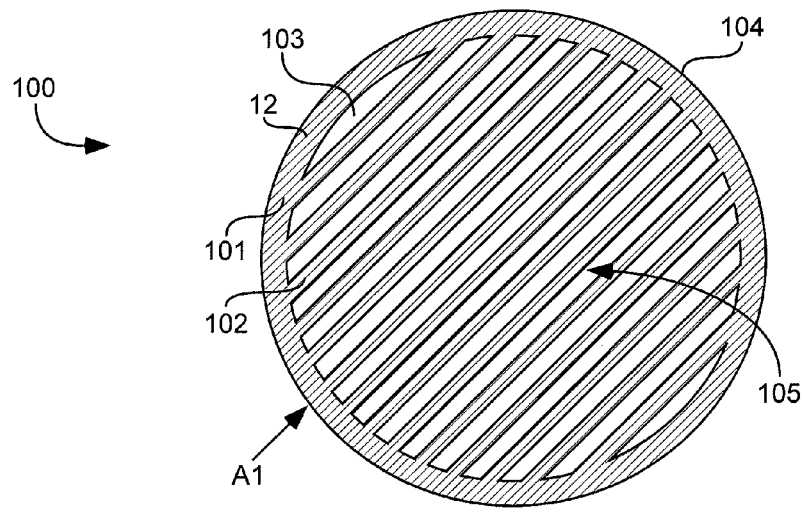
FIG. 10 is a schematic top view of an x-ray window support structure, in accordance with an embodiment of the present invention.

Shown in FIG. 10 is a support structure 100 for an x-ray window. The support structure 100 can comprise a support frame 101 defining a perimeter 104 and an aperture 105. A plurality of ribs 102 can extend across the aperture 105 of the support frame 101 and can be carried by the support frame 101, with openings 103 between the ribs 102. The support frame 101 and the plurality of ribs 102 can comprise a support structure 100. The support structure 100 can comprise a carbon fiber composite (CFC) material. The CFC material can comprise carbon fibers embedded in a matrix. Carbon fibers 12 in the composite can be substantially aligned with a direction A1 of the ribs, with at least one direction of the ribs if the ribs extend in multiple directions, or with all directions of all ribs if the ribs extend in multiple directions.

Carbon fibers in a carbon fiber composite can be graphitic, and thus can be highly resistant to chemical etching. Alternative methods have been found for etching or cutting micro-sized structures in CFC wafers in the present invention. The support structure 100 may be made by cutting a CFC wafer to form ribs 102 and openings 103. The CFC wafer may be cut by laser milling or laser ablation. A high power laser can use short pulses of laser to ablate the material to form the openings 103 by ultrafast laser ablation. A femtosecond laser may be used. A nanosecond pulsed YAG laser may be used. Ablating wafer material in short pulses of high power laser can be used in order to avoid overheating the CFC material. Alternatively, a non-pulsing laser can be used and the wafer can be cooled by other methods, such as conductive or convective heat removal. The wafer can be cooled by water flow or air across the wafer. The above mentioned cooling methods can also be used with laser pulses, such as a femtosecond laser, if additional cooling is needed.

Figure 11:
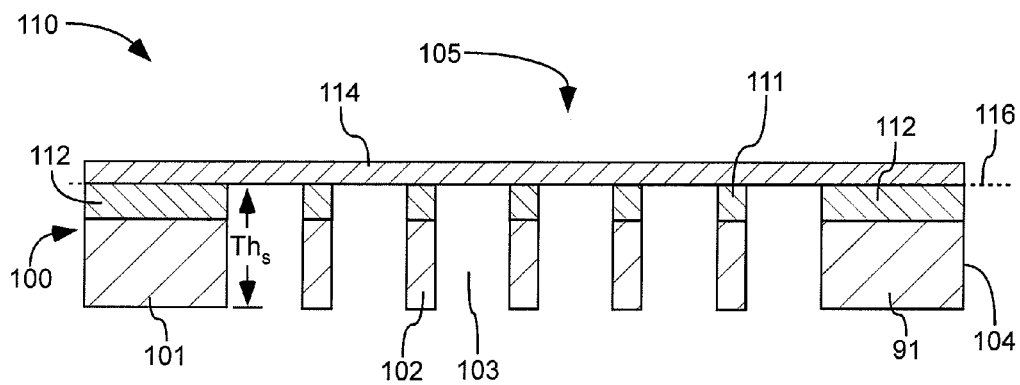
FIG. 11 is a schematic cross-sectional side view of an x-ray window, in accordance with an embodiment of the present invention.

As shown in FIG. 11, the support structure 100 can have a thickness $Th_s$ of between 10-500 micrometers. Tops of the ribs 102 and support frame 101 can terminate substantially in a single plane 116. A film 114 can be disposed over, can be carried by, and can span the plurality of ribs 102 and can be disposed over and can span the openings 103. The film 114 can be configured to pass radiation therethrough, such as by being made of a material and thickness that will allow x-ray radiation to pass through with minimal attenuation of x-rays and/or minimal contamination of the x-ray signal.

As described above regarding FIGS. 6-9, a polyimide layer 61 can be cured abutting the CFC stack 71. The polyimide layer 61 can be cut into polyimide ribs 111 and a polyimide support frame 112, with openings 103 between the ribs 111, along with the CFC stack 71. The polyimide ribs 111 and the polyimide support frame 112 can be part of the support structure 100. The polyimide ribs 111 and the polyimide support frame 112 can be disposed between the CFC stack 71 and the film 114.

A surface of the support structure 100 facing the film can have low surface roughness. This surface can be CFC 71 or can be polyimide 61. This surface can have a root mean square surface roughness Rq of less than 300 nm in one aspect, or between 30 nm and 300 nm in another aspect, in an area of 100 micrometers by 100 micrometers. This surface can have a root mean square surface roughness Rq of less than 500 nm in one aspect, or between 50 nm and 500 nm in another aspect, along a line of 2 millimeter length. This surface can have a root mean square surface roughness Rq of less than 200 nanometers in one aspect, or between 20 nm and 200 nm in another aspect, in an area of 100 micrometers by 100 micrometers.

The ribs 102 can have a strain at fracture of greater than 0.01 in one aspect, greater than 0.03 in another aspect, greater than 0.05 in another aspect, or between 0.01 and 0.080 in another aspect. Strain can be defined as a change in length caused by a force in a direction parallel with the ribs divided by original length. If fibers are directionally aligned, the force F can be aligned parallel with the fibers.

The wafers described herein can also be micropatterned by laser ablation and/or water jet to form other structures, such as a flexure mechanical mechanism, a mesoscale mechanical mechanism, a microscale mechanical mechanism, and/or elements in a microelectromechanical system (MEMS).

Figure 12:
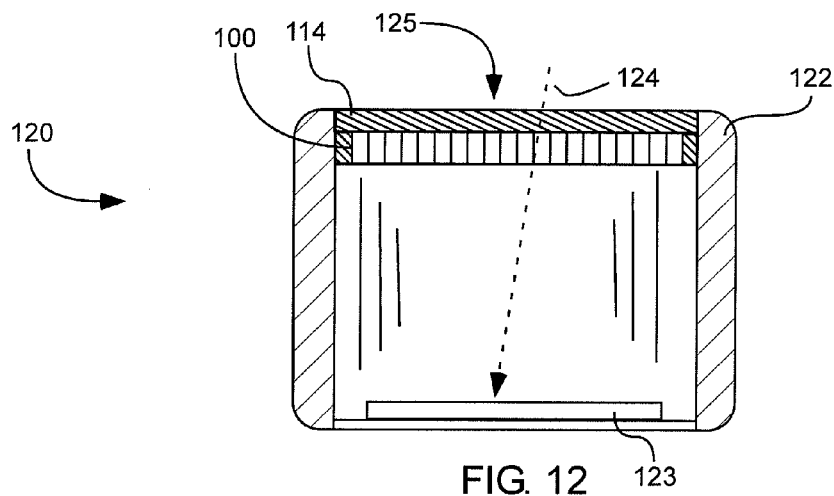
FIG. 12 is a schematic cross-sectional side view of an x-ray detector, including an x-ray window, in accordance with an embodiment of the present invention.

As shown in FIG. 12, an x-ray window 125, including a support structure 100 and a film 114, can be hermetically sealed to a housing 122. The housing can contain an x-ray detector 123. The x-ray detector can be configured to receive x-rays 124 transmitted through the window, and to output a signal based on x-ray energy.

What is claimed is:

1. A wafer comprising:
   a. at least one sheet of carbon fiber composite (CFC) including carbon fibers embedded in a matrix;
   b. a wafer thickness of between 10-500 micrometers;
   c. at least one side of the wafer having a root mean square surface roughness Rq of less than 300 nm in an area of 100 micrometers by 100 micrometers and less than 500 nm along a line of 2 millimeter length;
   d. a yield strength at fracture of greater than 0.5 gigapascals (GPa), wherein yield strength is defined as a force, in a direction parallel with a plane of a side of the wafer, per unit area, to cause the wafer to fracture; and
   e. a strain at fracture of more than 0.01, wherein strain is defined as the change in length caused by a force in a direction parallel with a plane of the wafer divided by original length.

2. The wafer of claim 1, wherein the yield strength is between 2 GPa and 3.6 GPa.

3. The wafer of claim 1, wherein the root mean square surface roughness is less than 200 nanometers in an area of 100 micrometers by 100 micrometers.

4. The wafer of claim 1, wherein at least 90% of the carbon fibers have a diameter of between 2 and 10 micrometers.

5. The wafer of claim 1, wherein the matrix comprises a material selected from the group consisting of polyimide, bismaleimide, epoxy, or combinations thereof.

6. The wafer of claim 1, further comprising a polyimide sheet cured together with and abutting the at least one sheet of carbon fiber composite.

7. The wafer of claim 6, wherein the polyimide sheet has a thickness of between 0.1-100 micrometers.

8. The wafer of claim 1 micropatterned by laser ablation, water jet, or combinations thereof to form an x-ray window support structure comprising:
   a. a support frame defining a perimeter and an aperture;
   b. a plurality of ribs extending across the aperture of the support frame and carried by the support frame;
   c. openings between the plurality of ribs; and
   d. the support frame and the plurality of ribs comprising a support structure.

9. An x-ray window comprising:
   a. a support frame defining a perimeter and an aperture;
   b. a plurality of ribs extending across the aperture of the support frame and carried by the support frame;
   c. openings between the plurality of ribs;
   d. the support frame and the plurality of ribs comprising a support structure;
   e. the support structure comprising a carbon fiber composite (CFC) material, the CFC material comprising carbon fibers embedded in a matrix;
   f. the support structure having a thickness of between 10-500 micrometers;
   g. a film disposed over, carried by, and spanning the plurality of ribs and disposed over and spanning the openings, and configured to pass x-ray radiation therethrough; and
   h. a surface of the support structure facing the film having a root mean square surface roughness Rq of less than 500 nm along a line of 2 millimeter length.

10. The x-ray window of claim 9, wherein the support structure further comprises a polyimide layer cured together with the CFC material, cut to form ribs, openings, and support frame together with the CFC material, and disposed between the CFC material and the film.

11. The x-ray window of claim 9, further comprising:
    a. a housing to which the x-ray window is hermetically sealed; and
    b. an x-ray detector, disposed within the housing, configured to receive x-rays transmitted through the window, and to output a signal based on x-ray energy.

12. The x-ray window of claim 9, wherein the matrix comprises polymide.

13. The x-ray window of claim 9, wherein the matrix comprises bismaleimide.

* * * * *